US011944947B2

(12) United States Patent
Bublewitz et al.

(10) Patent No.: US 11,944,947 B2
(45) Date of Patent: Apr. 2, 2024

(54) MIXER AND METHOD FOR MIXING TWO COMPONENTS

(71) Applicant: 3LMED GMBH, Marburg/Lahn (DE)

(72) Inventors: Alexander Bublewitz, Herborn (DE); Jens-Peter Reber, Meinerzhagen (DE)

(73) Assignee: 3LMED GMBH, Marburg (DE)

( * ) Notice: Subject to any disclaimer, the term of this patent is extended or adjusted under 35 U.S.C. 154(b) by 314 days.

(21) Appl. No.: 17/054,595

(22) PCT Filed: Jan. 7, 2020

(86) PCT No.: PCT/EP2020/050231

§ 371 (c)(1),
(2) Date: Nov. 11, 2020

(87) PCT Pub. No.: WO2020/151940

PCT Pub. Date: Jul. 30, 2020

(65) Prior Publication Data

US 2021/0362108 A1 Nov. 25, 2021

(30) Foreign Application Priority Data

Jan. 23, 2019 (DE) ........................ 102019101644.4

(51) Int. Cl.
*B01F 15/04* (2006.01)
*B01F 3/10* (2006.01)
(Continued)

(52) U.S. Cl.
CPC .............. *B01F 35/83* (2022.01); *B01F 23/47* (2022.01); *B01F 25/431* (2022.01);
(Continued)

(58) Field of Classification Search
CPC .. B05C 17/00553; B01F 25/431; B01F 35/83; B01F 2101/19; A61C 5/64
See application file for complete search history.

(56) References Cited

U.S. PATENT DOCUMENTS 5,498,078 A 3/1996 Keller
6,135,631 A * 10/2000 Keller .............. B01F 25/43141
222/145.6
(Continued)

FOREIGN PATENT DOCUMENTS

DE 202012013429 U1 1/2017
DE 102017117199 A1 1/2019
(Continued)

*Primary Examiner* — Elizabeth Insler
(74) *Attorney, Agent, or Firm* — McDonnell Boehnen Hulbert & Berghoff LLP

(57) ABSTRACT

The disclosure relates to a specifically static mixer for mixing two components, with a housing, in which a mixing element is accommodated, and an input part with a first intake and a diametrically opposite second intake, wherein, within the input part, a first channel is formed between the first intake and the mixing chamber and a second channel is formed between the second intake and the mixing chamber. The first channel extends radially inward from the first intake and opens into a central opening in the cover. The second channel has two partial channels as storage chambers not leading into the mixing chamber, and two intake sections located radially within the storage chambers and leading into the mixing chamber. The intake sections branch off the respective storage chambers, extend inward in the opposite direction to the first channel and open into the central opening in the cover.

10 Claims, 4 Drawing Sheets

(51) Int. Cl.

| | |
|---|---|
| ***B01F 5/06*** | (2006.01) |
| ***B01F 15/00*** | (2006.01) |
| ***B01F 23/47*** | (2022.01) |
| ***B01F 25/431*** | (2022.01) |
| ***B01F 35/52*** | (2022.01) |
| ***B01F 35/83*** | (2022.01) |
| *B01F 101/00* | (2022.01) |
| *B01F 101/19* | (2022.01) |
| *B05C 17/005* | (2006.01) |

(52) U.S. Cl.

CPC ........ *B01F 35/522* (2022.01); *B01F 2101/19* (2022.01); *B01F 2101/2305* (2022.01); *B01F 2215/0422* (2013.01); *B05C 17/00553* (2013.01)

(56) References Cited

U.S. PATENT DOCUMENTS

| | | | |
|---|---|---|---|
| 7,674,033 B2 | 3/2010 | Pauser et al. | |
| 8,960,501 B2 * | 2/2015 | Pappalardo | B01F 25/12 222/145.5 |
| 9,289,797 B2 | 3/2016 | Pappalardo | |
| 11,047,776 B2 | 6/2021 | Kitagawa | |
| 2014/0301154 A1 * | 10/2014 | Bublewitz | B01F 25/43141 366/177.1 |
| 2020/0171448 A1 | 6/2020 | Bublewitz et al. | |

FOREIGN PATENT DOCUMENTS

| | | | |
|---|---|---|---|
| EP | 0664153 | B1 | 3/1999 |
| EP | 0885651 | B1 | 11/2002 |
| EP | 1802385 | B1 | 1/2008 |
| EP | 2724788 | A1 | 4/2014 |
| EP | 2727654 | A1 | 5/2014 |
| EP | 1368113 | B2 | 1/2015 |
| EP | 3162433 | A1 | 5/2017 |
| JP | H1199325 | A | 4/1999 |
| JP | 2014087790 | A | 5/2014 |
| KR | 20130060142 | A | 6/2013 |

* cited by examiner

MIXER AND METHOD FOR MIXING TWO COMPONENTS

CROSS REFERENCE TO RELATED APPLICATIONS

The present application is a U.S. National Phase Application pursuant to 35 U.S.C. § 371 of International Application No. PCT/EP2020/050231 filed Jan. 7, 2020, which claims priority to German Patent Application No. 10 2019 101 644.4 filed Jan. 23, 2019. The entire disclosure contents of these applications are herewith incorporated by reference into the present application.

TECHNICAL FIELD

The disclosure relates to a mixer, specifically a static mixer, as well as to a method for mixing two components, for example a base component and a catalyst component, using such a mixer.

BACKGROUND

Such a mixer has a housing that defines a mixing chamber with a central longitudinal axis in which a mixing element is accommodated, and an input part with a first intake and a second intake diametrically opposite to the first. The input part is connected to the housing in a freely rotatable manner. Within the input part, a first channel is formed between the first intake and the mixing chamber, and a second channel is formed between the second intake and the mixing chamber, which respectively are delimited by walls formed in the input part and by a cover.

In such mixers, the problem may occur that one of the two components to be mixed advances ahead, i.e., enters the mixing chamber before the other component does. Furthermore, it is also known that the components do not enter the mixer in the correct mixing ratio at the beginning of the mixing process. Both of these situations can result in the production of a small amount of an unusable mixture at the beginning of the mixing process, in which unusable mixture the components do not react or do not react sufficiently with each other due to a less-than-ideal mixing ratio.

To solve this problem, EP 0 664 153 B1 proposes a static mixer, the mixing element of which has a section in which the components to be mixed flow around each other before being deflected at mixing coils. This mixer consists of only two parts, namely a housing and the mixing element. Another static mixer is proposed in EP 0 885 651 B1. Therein, a component present in a relatively larger volume is deflected into two partial streams by means of an approximately U-shaped wall up to the intake of the component present in a relatively smaller volume, such that both components are routed inward to a mixing element together.

EP 1 802 385 B1 and EP 1 368 113 B2 describe dynamic mixers with rotating mixing blades, in which a portion of the components to be mixed or a portion of the mixture produced in the mixer are collected. In these dynamic mixers, the components are routed axially, i.e., essentially parallel to the rotational axis, into the mixing chamber.

The as yet unpublished German patent application 10 2017 117 199 describes a static mixer for mixing two components, which mixer is particularly suitable for mixing ratios with small volume differences of the components, e.g., mixing ratios such as 1:1 or 1:2. For this purpose, a compensation channel is formed in the input part, which connects the intakes of the two components. In addition, at least one storage chamber can be provided in the mixing element for accommodating a component prone to advancing ahead.

In contrast, the problem underlying the disclosure is to provide a mixer, which is also suitable for mixing ratios with greater volume differences of the components, e.g., mixing ratios of 1:10, 1:5 or 1:4, while avoiding the problems mentioned above with initially unsatisfactory mixing results.

SUMMARY

This problem is solved by a method according to Claim 1. In a mixer of the type mentioned above, the first channel, according to the disclosure, extends radially inward from the first intake and opens into a central opening in the cover. In other words, the first channel extends in a straight line from the outside to the inside, whereby the first component quickly enters the mixing chamber on a direct path. Furthermore, the second channel has two partial channels as storage chambers not leading into the mixing chamber, each of which leads in an annular-segment shape from the second intake to a wall delimiting the first channel, and has two intake sections located radially within the storage chambers and leading into the mixing chamber. Therein, according to the disclosure, the intake sections can branch off the respective storage chambers, extend inward in the opposite direction to the first channel and open into the central opening in the cover.

A feature of the disclosure thus is that the storage chambers are separated from the first channel by walls in the input part of the mixer, such that the first component can flow into the mixing chamber through the first channel, without the second component, which is possibly advancing ahead, pushing back and/or suppressing the first component. Therein, the storage chambers are preferably radially outside the intake sections leading into the mixing chamber.

If the first channel and the intake sections of the second channel extend in such a way that the components flow inwardly in directions opposite to each other, in particular in radial directions, before they open into the central opening in the cover, one of the components surrounds the other component upon entry into the mixing chamber. This is preferred for a good mixing result.

A static mixer according to the present disclosure preferably consists of at least two separate parts, namely the mixer housing and the mixing element accommodated therein with the input part. The mixing element and the input part may also be formed separately in a mixer according to the disclosure, such that the mixer then consists of at least three parts. The mixing element and, correspondingly, the mixing chamber in the mixer housing may have a square cross-section at a right angle to the longitudinal axis of the mixer. This has proven to be particularly favorable for good mixing results at a small length of the mixer. If the housing together with the mixing element is rotatable relative to the input part, the housing of the mixer can be directly connected to a cartridge, for example by a threaded or bayonet connection. A union nut, which is often required in the prior art as a separate component, is therefore unnecessary. However, the use of a union nut is not excluded in the mixer according to the disclosure. As an additional component, the mixer can optionally be provided with a deployment or application element, which can be mounted on the side opposite from the input part in a fixed or detachable manner.

The cover, which delimits the first channel and the second channel on one side and which has the central opening which opens into the mixing chamber, is preferably formed of one piece with the mixing element or of one piece with the housing of the mixer. The cover can be designed as a flange-like collar of the mixing element or as a contact surface on the inside of the housing. Alternatively, it is also possible to provide a separate cover, which is accommodated in the housing between the input part and the mixing element. In principle, the central opening can be round, square or slot-shaped.

In order to prevent the second component, which is possibly advancing ahead, from pushing back and/or suppressing the first component, the second component, according to the disclosure, is initially routed into the storage chambers. Therein, the intake sections preferably branch off from one of the storage chambers at locations spaced apart from each other by a wall section. This prevents the second component from flowing directly radially inward from the second intake. Rather, the second component is first deflected into the storage chambers by means of the wall section. It has proved to be advantageous with regard to a reduction of the installation space of the mixer if the wall section forms the end of the first channel opposite from the first intake. In other words, the first component can be separated from the second component by means of this wall section, which may be arc-shaped, in order to prevent a premature collision of the components.

According to a preferred embodiment, the first channel is separated from the intake sections by wall sections. In other words, the first channel in this embodiment is completely closed with the exception of the first intake and the central opening in the cover. This embodiment prevents a premature collision of the components particularly effectively.

Alternatively, it is possible that the intake sections open into the first channel in the area of the central opening in the cover. In this embodiment, the components are initially routed separately from each other and only collide when they are routed together through the central opening in the cover. This embodiment also effectively prevents the second component from obstructing or suppressing the inflow of the first component.

The first channel, which specifically extends radially inward along a straight line, at least extends up to the longitudinal axis, i.e., up to a central point of the mixer, at which the opening is provided in the cover. The opening in the cover has a certain diameter and it is preferred that the first channel extends across the entire diameter of the opening. In other words, the first channel may extend from the first intake beyond the longitudinal axis.

In order to prevent the second component from flowing prematurely from the storage chambers towards the central opening in the cover, it is preferred that the storage chambers are separated from the intake sections by wall sections, in particular arc-shaped wall sections.

However, it is also possible to dispense with such wall sections in whole or in part, if the second component is initially directed, in particular directed by a curved deflection element immediately adjoining the second intake, in an approximately arc-shaped flow path from the second intake to the wall delimiting the first channel. Only then does the second component also flow radially inward toward the central opening in the cover. In other words, the size of the transition from the storage chamber to the respective intake section can be varied, wherein the viscosity of the second component must be taken into account. If the second component has a low viscosity, this transition is preferably smaller than if the second component has a viscous consistency, in which case the wall sections can be dispensed with.

According to the disclosure, the two components are fed to the mixer through the intakes, such that the components flow through the intakes in the axial direction, i.e., parallel to the longitudinal axis. Therein, the intakes can be designed as cylindrical or conical nozzles. The components are then deflected in the first channel or the second channel by 90° to a plane that essentially extends transversely to the longitudinal axis. When the components then flow from the respective channels through the central opening in the cover, the components are again deflected by 90°, such that they again flow essentially parallel to the longitudinal axis.

While the second component is additionally diverted into the storage chambers or into the intake sections of the second channel, the first component can flow radially inward in an essentially straight line. According to a preferred embodiment of the mixer according to the disclosure, the input part has a bottom opposite to the cover, into which the intakes open. Therein, the bottom can extend at an angle to the plane of the cover at least in the area of the first channel, in particular in such a manner that the bottom approaches the cover from the first intake. This has the effect of deflecting the first component, which flows through the first channel, in the direction of the mixing chamber while it still is in the first channel. The first component is thus fed to the mixing chamber, for example, in the shape of a ribbon.

In addition, the first component in this embodiment is deflected by less than 90°, both during the transition from the first intake to the first channel and during the transition from the first channel to the central opening. This reduces the flow resistance for the first component. In order not to reduce the cross-sectional area in the first channel in this embodiment, the first channel can have a cross-section expanding, e.g., expanding conically, in a transverse direction to the longitudinal axis.

The size of the storage chambers corresponds to the expected amount of the second component advancing ahead, for example. For this purpose, the storage chambers can extend from the middle of the second intake by 140° to 175°, in particular by 155° to 165°, for example by 160°, around the longitudinal axis. This delivers good results, for example, for dental impression materials with mixing ratios between 1:10, 1:5, 1:4 and 1:2.

To avoid constrictions that generate an increased flow resistance, the volume ratio of the components to be mixed preferably corresponds to the ratio of the cross-sectional areas of the first channel and the second channel.

The disclosure furthermore relates to a method for mixing a first component with a second component in a static mixer, in particular in a static mixer of the type mentioned above.

The method according to the disclosure is characterized in that the components are routed separately from each other through the intakes into the input part, such that the first component is routed through the first channel and further through the central opening in the cover into the mixing chamber, and the second component in the second channel is first routed into the storage chambers. Only when these are filled to at least 50%, in particular to at least 80%, with the second component, is the second component routed through the intake sections and further through the central opening in the cover into the mixing chamber, where the two components are mixed together by multiple deflection at the mixing element. This leads to a good mixing result from the beginning.

In order to mix the two components well using this method, it is particularly preferred if a ribbon-shaped strand of the first component is routed through the central opening in the cover, which strand is surrounded on both sides by a ribbon-shaped strand of the second component. The second component does not have to completely surround the first component; rather, it is sufficient if strands of the first component are arranged between respective strands of the second component.

In the following, the disclosure will be explained in greater detail on the basis of exemplary embodiments and with reference to the drawings. Therein, all described and/or figuratively represented features individually or in any combination constitute the object of the disclosure, regardless of how they are summarized in the claims or of their dependence on each other.

DETAILED DESCRIPTION

Figure 1A:
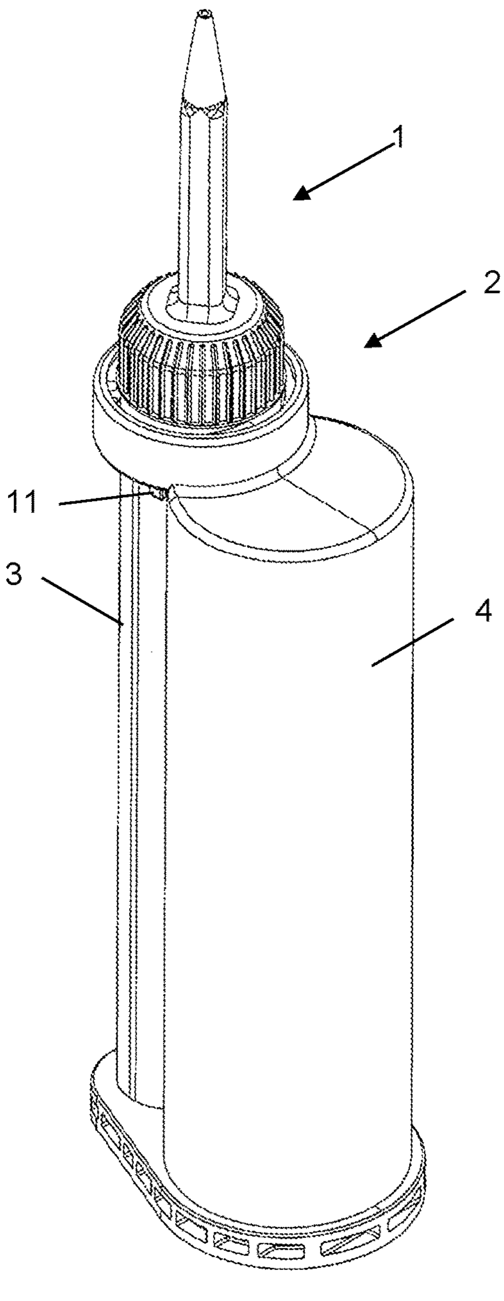
FIG. 1A shows a mixer according to a first embodiment of the disclosure together with a cartridge
Figure 1B:
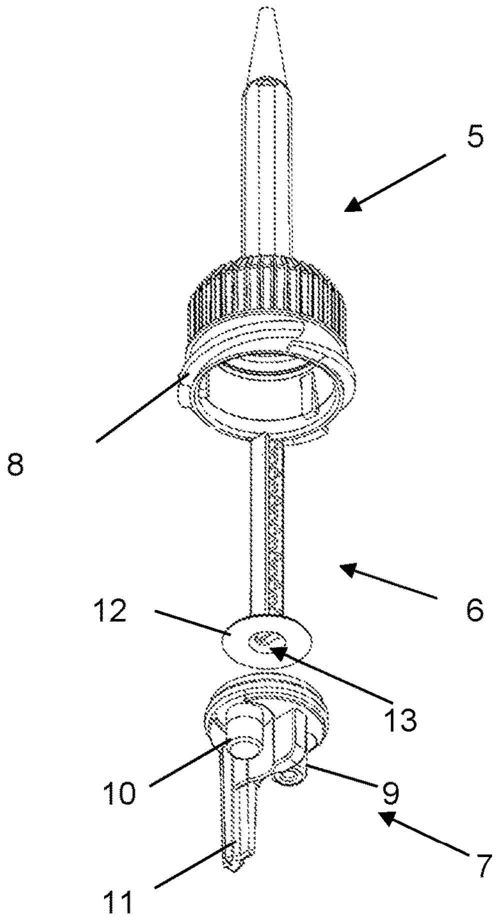
FIG. 1B shows the parts of the mixer according to FIG. 1A in an exploded view

FIG. 1*a* shows a mixer 1 according to the invention together with a cartridge 2, which has two chambers 3, 4 with components to be mixed. In the embodiment shown, the chamber 3 has a significantly smaller cross-section than the chamber 4, such that a mixing ratio of the components deviating from 1:1 is generated in the mixer 1 at identical piston advances in the respective chambers.

Figure 1C:
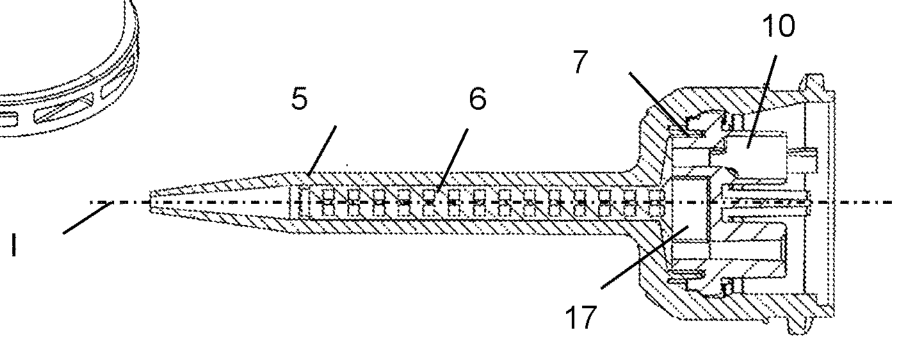
FIG. 1C shows the mixer according to FIG. 1A in a sectional view

The mixer 1 has three components in the embodiment shown, namely a housing 5, a mixing element 6 and an input part 7. The housing 5 is equipped with an external thread 8, by means of which the mixer 1 can be connected with the cartridge 2, which has an internal thread, not shown here. The chambers 3, 4 of the cartridge 2 are provided with respective outlets, not shown here, which can be connected with the intakes 9, 10 of the mixer 1, for example by inserting the intakes 9, 10 into the outlets. It is visible in FIG. 1C that the cross-section of the intake 9 is smaller than that of the intake 10, corresponding to the ratio of the cross-section of the chambers 3, 4. However, the outer diameter of the intakes 9 and 10 formed as intake nozzles preferably is the same.

To align the mixer 1 to the cartridge 2, a guiding protrusion 11 is provided at the input part 7, which protrudes beyond the cylindrical inlets 9, 10. The guiding protrusion 11 can be inserted into an opening of the cartridge 2 (not shown here in detail), such that the intakes 9, 10 can be lined up with the corresponding outlets of the cartridge 2. To mount the mixer 1 to the cartridge 2, the housing 5 is rotated relative to the input part 7, whereby the thread 8 screws into the corresponding thread of the cartridge.

In the embodiment shown, the mixing element 6 is formed with a square cross-section and is thus held in a rotationally fixed manner in a mixing chamber in the housing 5, which chamber also has a square shape on the inside. To fix or release the mixer 1, the housing 5 and the mixing element 6 are rotated relative to the input part 7.

The mixing element 6 is provided with a cover 12 on its side facing the input part 7, which cover 12 protrudes essentially radially outward as a flange-like collar from the mixing element 6. A central opening 13 is formed in the cover 12, which opening 13 in the shown embodiment is arranged concentrically to the longitudinal axis I of the mixer 1. Components can enter the mixing chamber through this opening 13, in which chamber they are deflected at the mixing element 6 for mixing the components.

Figure 1D:
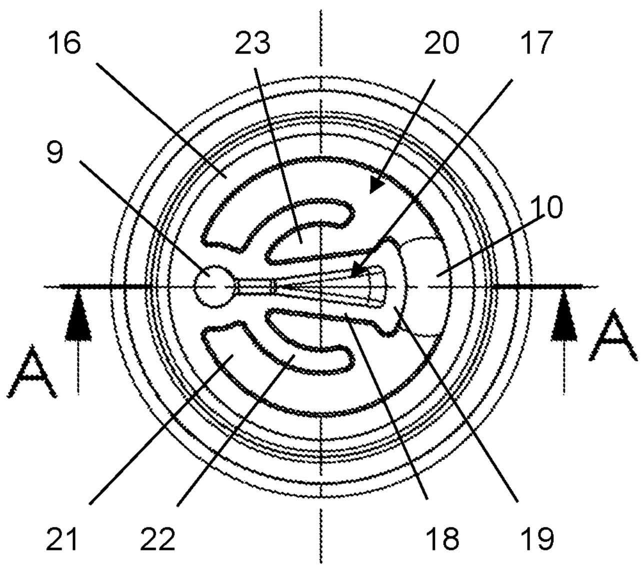
FIG. 1D shows a plan view of the input part of the mixer according to FIG. 1A
Figure 1E:
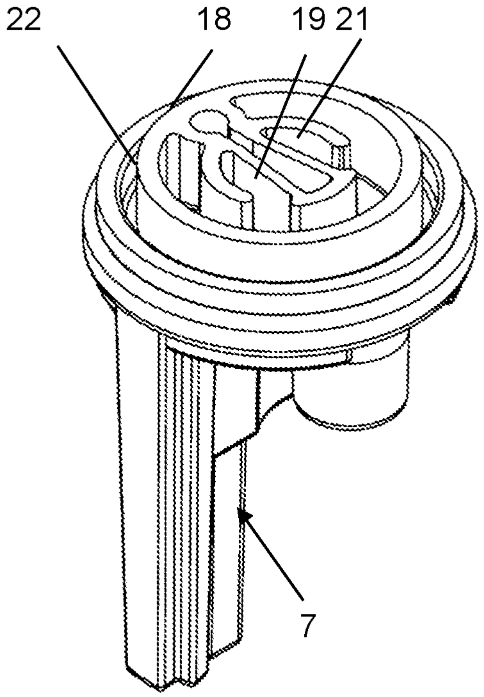
FIG. 1E shows the input part of the mixer according to FIG. 1A in a perspective view
Figure 1F:
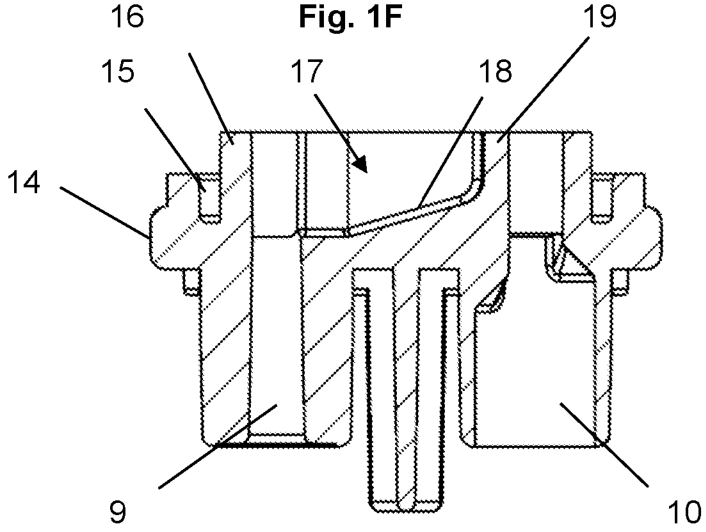
FIG. 1F shows a sectional view along the line A-A of the input part of the mixer according to FIG. 1A

The input part 7 of the mixer 1 is shown in FIGS. 1D to 1F. The input part 7 is provided with an annular bead 14 at its outer circumference, which annular bead 14 serves for mounting the input part 7 in the housing 5 in such a manner that it is freely rotatable about its axis. An area with an annular groove 15 is provided radially within the annular bead 14, with which an annular protrusion of the housing 5 can engage to seal the housing 5 against the input part 7 (see also FIG. 1C). A circular wall 16 is formed radially within the groove 15, which wall 16 surrounds an area in which the components can be routed through two channels from the intakes 9, 10 to the opening 13 and into the mixing chamber.

The first channel 17 for the component of a relatively smaller volume extends from the first intake 9 radially inward to the area in which the central opening 13 is formed in the cover 12. Thus, the first channel 17 extends in a straight line from the first intake 9 to beyond the longitudinal axis 1. As is visible in FIG. 1*d*, the first channel 17 can expand conically. In the embodiment shown, this compensates for the fact that the bottom 18 of the first channel 17 approaches the plane of the cover 12, i.e., the upper edge in FIG. 1F, from the first intake 9.

In the first embodiment shown here, the first channel 17 is completely closed on its sides by means of wall sections 18, 19. In other words, the first channel 17 is only open at one end toward the first intake 9 and at the opposite central inner end toward the central opening 13 of the cover 12. Otherwise, the first channel 17 is closed toward the top (in FIG. 1E or 1F) by the cover 12.

The second channel 20 initially has two storage chambers 21, which extend from the second intake 10 in a curve about the longitudinal axis I up to the respective wall section 18, which delimits the first channel 17 on its side. The second component, which is relatively larger in volume, and which is routed through the second intake 10 into the second channel 20, is initially directed through the arc-shaped curved wall section 19 into the two storage chambers 21. In the embodiment shown, the storage chambers 21 are delimited inward by arc-shaped wall sections 22.

Respective passages are formed between the arc-shaped wall portions 22 and the curved wall section 19, which connect the respective storage chambers 21 with an intake section 23 located radially inward. The intake sections 23 formed on both sides of the first channel 17 extend in the opposite direction to the channel 17 and also open into the central opening 13 of the cover 12. In other words, an approximately ribbon-shaped strand of the first component advances through the central opening 13, which strand is surrounded on both sides by an approximately ribbon-shaped strand of the second component.

The curved wall section 19 is arranged directly adjacent to the second intake 10, such that the second component first flows into the storage chamber 21 at the beginning of the mixing process and only is routed into the intake sections 23 as a result of the higher pressure when said storage chambers 21 are largely filled, for example filled to at least 80%. At the beginning of the mixing process, the first component can thus flow through the first channel 17 to the mixing chamber unobstructed by the second component. This prevents the second component, which is possibly advancing ahead, from obstructing or even suppressing the inflow of the first component into the mixing chamber. This results in a good mixing ratio from the beginning.

Figure 2A:
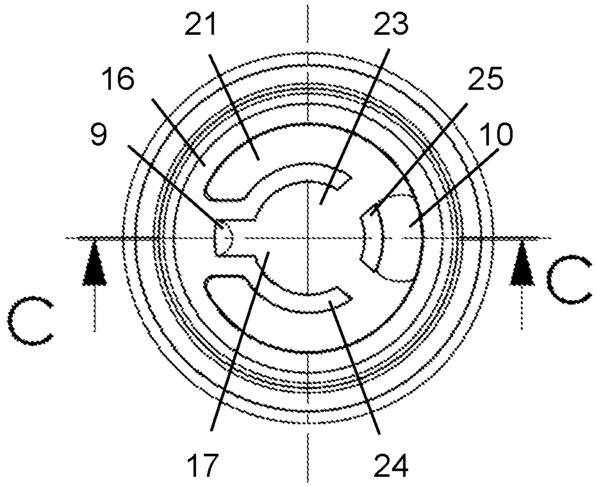
FIG. 2A shows a plan view of the input part of a mixer according to a second embodiment of the invention
Figure 2B:
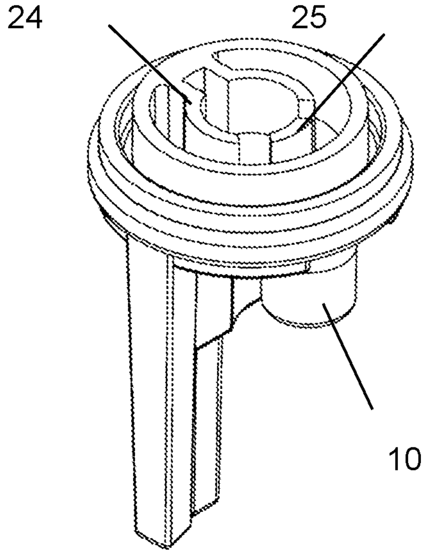
FIG. 2B shows the input part of the mixer according to FIG. 2A in a perspective view
Figure 2C:
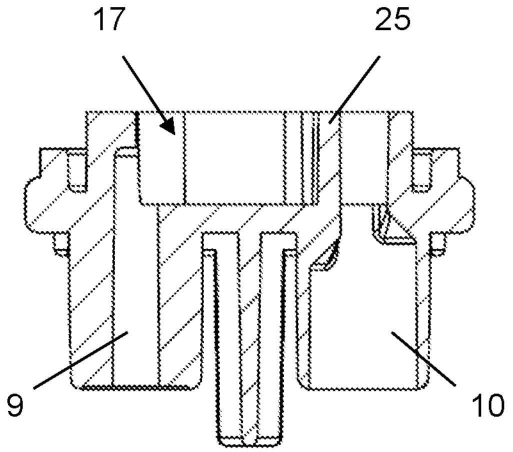
FIG. 2C shows a sectional view along the line C-C of the input part of the mixer according to FIG. 2A

A second embodiment of the disclosure is shown in FIGS. 2A to 2C, wherein, compared to the first embodiment, only the geometry of the channels 17, 20 in the input part 7 of the mixer 1 is changed.

The first channel 17 in turn extends starting from the first intake 9 radially inward along a straight line to an area in which the central opening 13 is formed in the cover 12. The first channel 17 in turn is delimited laterally by wall sections 24 and on the side opposite to the first intake 9 by a curved wall section 25. Therein, the lateral wall sections 24 partially extend in an arc-shaped manner, such that they, together with the curved wall section 25, surround a central circular area of the first channel 17.

This central circular area of the first channel 17 simultaneously forms the intake areas 23 of the second channel 20 for the second component. For this purpose, respective passages are formed in the lateral wall section 24 on both sides of the curved wall section 25. The lateral wall sections 24 in turn separate arc-shaped storage chambers 21 of the second channel 20 from the intake areas 23 and from the first channel 17. Thus, much like in the first embodiment, the second component here initially flows into the storage chambers 21 deflected by the curved wall section 25 until these storage chambers 21 are at least mostly filled, and is then routed through the two passages against the flow direction in the first channel 17 into the intake areas 23, from where both components together enter the mixing chamber through the central opening 13.

In this second embodiment of the disclosure, the two components are therefore brought into contact with each other immediately before passing through the central opening 13 into the mixing chamber, wherein again an approximately ribbon-shaped strand of the first component is surrounded on both sides by an approximately ribbon-shaped strand of the second component.

As shown in FIG. 2C, the bottom 18 of the first channel 17 in this exemplary embodiment extends essentially parallel to the plane defined by the cover 12, i.e., the upper edge of the wall 16 in FIG. 2C.

Figure 3A:
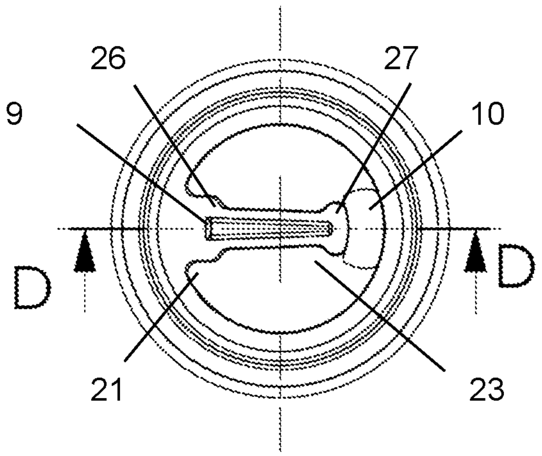
FIG. 3A shows a plan view of the input part of a mixer according to a third embodiment of the invention
Figure 3B:
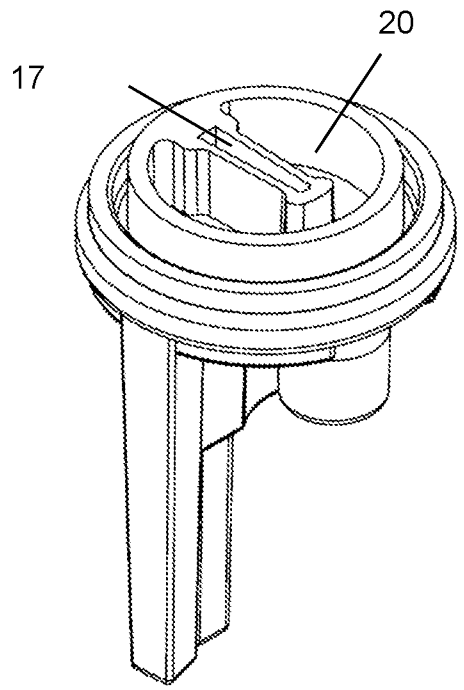
FIG. 3B shows the input part of the mixer according to FIG. 3A in a perspective view
Figure 3C:
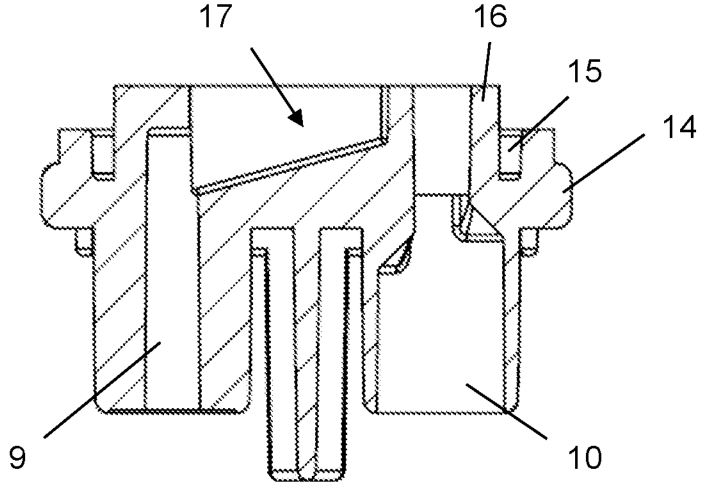
FIG. 3C shows a sectional view along the line D-D of the input part of the mixer according to FIG. 3A

A third embodiment of the disclosure is shown in FIGS. 3A to 3C, wherein, compared to the first two embodiments, only the geometry of the channels 17, 20 in the input part 7 of the mixer 1 is changed.

The third embodiment essentially corresponds to the first embodiment with respect to the design of the first channel 17, with a channel extending radially inward along a straight line, a bottom 18 rising up at an angle and wall sections 26, 27 which completely enclose the first channel 17 on the sides.

The second channel 20 in turn has circular storage chambers 21, into which the second component is deflected by means of the curved wall section 27 as it enters from the intake 10. In addition, there are intake sections 23 in the second channel 20, which are positioned radially within the storage chambers 21, through which intake sections 23 the second component is routed to the central opening 13 in the cover 12. Compared to the first embodiment, however, wall sections are missing in the third embodiment, which separate the storage chamber 21 from the intake sections 23. Thus, the volume available for the storage chamber at 21 and the intake sections 23 is greater than in the first embodiment.

All three embodiments shown have in common that the first component, for example a catalyst component of a dental material, is routed from the first intake 9 in the first channel 17 radially inward in a straight line and from there through the central opening 13 into the mixing chamber. On the other hand, in all three embodiments shown, the second component is initially separated into two partial streams by means of a curved wall section 19, 25 or 27, which is directly adjacent to the second intake 10, and is routed into the storage chambers 21 along an arc, which storage chambers 21 in the examples shown extend arc-shaped around the longitudinal axis I by approximately 160°. Only when these storage chambers 21 are at least mostly filled, does the second component enter the intake sections 23, which are located radially inward in relation to the storage chambers 21, from where it advances through the central opening 13 into the mixing chamber.

Due to the geometry of the first channel 17 and the second channel 20, an approximately ribbon-shaped strand of the first component is generated, as well as two approximately ribbon-shaped strands of the second component, between which the strand of the first component is positioned. The components are routed through the central opening 13 into the mixing chamber in this three-layer form. Combined with the collection in the storage chambers 21 of a portion of the second component that may be advancing ahead, this ensures a very good mixing result.

The invention claimed is:

1. A static mixer for mixing two components, comprising:

a housing which defines a mixing chamber with a central longitudinal axis, in which a mixing element is accommodated; and an input part with a first intake and a second intake diametrically opposite to the first intake, which input part is connected to the housing in such a manner that the input part is freely rotatable with respect to the housing, wherein, within the input part, a first channel is formed between the first intake and the mixing chamber, and a second channel is formed between the second intake and the mixing chamber, where the first and second channels are delimited by a first wall formed in the input part, a second wall formed in the input part, and by a cover, wherein the first channel extends radially inward from the first intake and opens into a central opening in the cover, wherein the second channel has two partial channels defining storage chambers not connecting to the mixing chamber, each of the two partial channels extend in an annular-segment shape from the second intake to the first wall delimiting the first channel, and has two intake sections located radially within the storage chambers and connecting to the mixing chamber, wherein the intake sections branch off the respective storage chambers, extend inward in the opposite direction to the first channel and open into the central opening in the cover, and wherein the respective intake sections branch off one of the storage chambers at locations spaced apart from each other by the second wall and wherein the second wall forms the end of the first channel opposite from the first intake.

2. The mixer according to claim 1, wherein the intake sections open into the first channel in the area of the central opening in the cover.

3. The mixer according to claim 1, wherein the first channel extends from the first intake along the longitudinal axis.

4. The mixer according to claim 1, wherein the storage chambers are separated from the intake sections by a pair of arc-shaped wall sections.

5. The mixer according to claim 1, wherein the input part has a bottom opposite to the cover into which the intakes open, wherein the bottom extends at an angle to the plane of the cover at least in the area of the first channel and approaches the cover starting from the first intake.

6. The mixer according to claim 1, wherein the first channel has a cross-section expanding conically in a transverse direction to the longitudinal axis.

7. The mixer according to claim 1, wherein the storage chambers extend from the middle of the second intake by 140° to 175° around the longitudinal axis.

8. The mixer according to claim 1, wherein the ratio of the volumes of the components to be mixed, e.g., 1:2, 1:4, 1:5 or 1:10, corresponds to the ratio of the cross-sectional areas of the first channel and the second channel.

9. The mixer according to claim 1, wherein the two intakes are each formed as intake nozzles with identical outer diameters, wherein the inner diameters of the inlet nozzles differ from each other.

10. A method for mixing a first component with a second component in a static mixer according to claim 1, comprising wherein the components are routed separately from each other through the intakes into the input part, such that the first component is routed through the first channel and on through the central opening in the cover into the mixing chamber, and the second component in the second channel is first routed into the storage chambers until these are filled with the second component to at least 50%, and only then is routed through the intake sections and on through the central opening in the cover into the mixing chamber, where the two components are mixed by multiple deflection at the mixing element.

* * * * *